Patented Jan. 8, 1929.

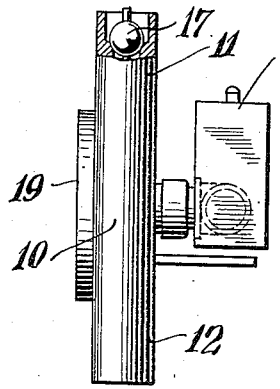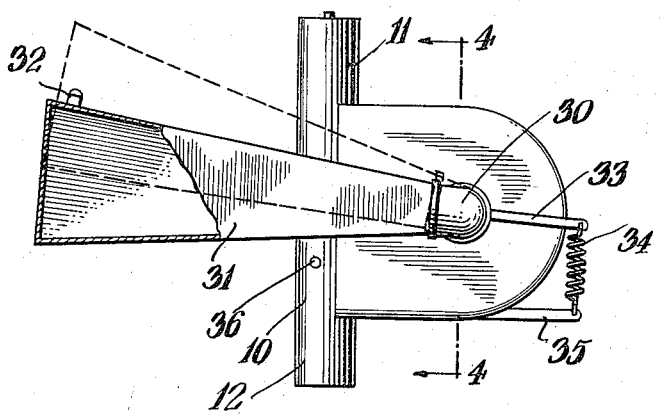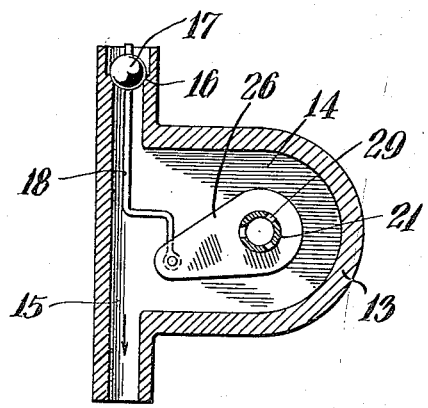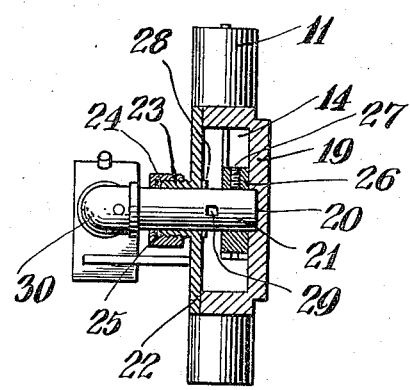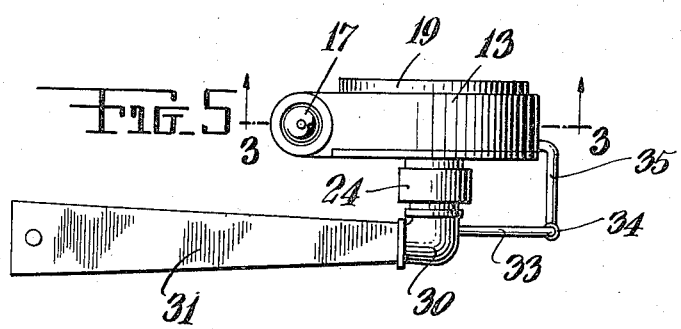

1,697,944

UNITED STATES PATENT OFFICE.

FRIEDRICH BENSKE, OF NEW YORK, N. Y.

FLUID-OPERATED VALVE.

Application filed September 28, 1927. Serial No. 222,423.

The main object of this invention is to provide a valve suitable for closing water circulation through a pipe which is emptied into a tank or similar other container. The valve is so constructed as to be operated by the fluid which passes through it immediately upon filling of the tank or other container for which the valve serves as a water control medium.

Another object of this invention is to provide a valve provided with a lever thereon which is filled with the fluid passing through the valve upon filling of the tank which the valve controls, thereby closing the valve and shutting off the circulation of the fluid through that member.

The above and other objects will become apparent in the description below, in which characters of reference refer to like-named parts in the drawing.

Referring briefly to the drawing, Figure 1 is an end elevational view of the valve.

Figure 2 is a side elevational view of the same, showing the reservoir lever in partly lifted position and broken to illustrate its construction.

Figure 3 is a cross sectional view taken on line 3—3 of Figure 5, showing the closure valve resting upon its seat.

Figure 4 is a cross sectional view taken on line 4—4 of Figure 2, showing the construction of the movement chamber.

Figure 5 is a top plan view of Figure 2.

Referring in detail to the drawing, the numeral 10 indicates a cylindrical conduit which has its inlet at the upper end 11 and its outlet at the lower end 12. A substantially semi-circular housing 13 is formed integral with the conduit and its chamber 14 communicates with the bore 15 of the conduit, as shown in Figure 3. In the upper end of the bore 15 a hemi-spherical seat 16 of relatively small area is formed in the end 11 of the conduit. This seat has normally resting thereon, when the valve is closed, a ball 17. The ball has a lifter rod 18 secured thereto. The rod projects upwardly above the ball 17 so that when the valve member is being installed this ball may be lifted above its seat. The housing 13 has a sunken floor 19 in which an annular recess 20 is formed. This recess receives the end of a fluid delivery pipe 21, the latter being rotatably joined in said recess. One face of the housing is open and is covered when the valve is assembled by a cover plate 22. The cover plate has a hub 23 extending outwardly therefrom, which has its external surface threaded in order to engage an internally flanged cable 24. The hub and cable form a stuffing box in which packing 25 is contained. The fluid delivery pipe 21 passes through the hub 23 outwardly a short distance beyond the top of the cable 24.

This fluid delivery pipe has an arm 26 secured thereto within the chamber 14 of the housing by a set screw 27. An encircling flange 28 is formed on the fluid delivery pipe 21 and is located adjacent the inner face of the cover plate 22 and positions the pipe 21 so that it cannot shift longitudinally out of its place. Between the flange 28 and the side of the arm 26, a plurality of square openings 29 are formed at spaced positions in the wall of the pipe 21 and permit circulation of the fluid contained in the housing 14 through these openings 29 into the bore of the pipe 21.

The outer end of the fluid delivery pipe has an elbow 30 secured to its outer end. To this elbow is attached a tapering, relatively long reservoir lever 31 which is completely sealed, but at its outer end has a valve 32 which permits the release of air out of the lever. The elbow 30 has a finger 33 extending rearwardly therefrom. The outer end of this finger has a coiled spring 34 attached thereto which hangs suspended and has its lower end secured to a hanger arm 35, the latter projecting rearwardly from the housing 13. A pin projects sidewise from the conduit 10 beneath the reservoir lever 31 and normally, when the valve is in closed position, this reservoir lever rests on said pin, the latter being indicated by the numeral 36.

The ball 17, to which the rod 18 is connected, is lifted or lowered by said rod, which latter is pivotally connected to the arm 26. The ends 11 and 12 of the conduit may be conveniently threaded or provided with any other means by which it may be connected to a pipe-line. When the ball 17 is in lifted position the fluid contained in the pipe-line may flow around and under the ball and circulate through the chamber 14 of the valve and through the bore 15 of the conduit to its outlet end 12. This valve is adapted to be used in a water circulating system which feeds a tank, vat or similar other container and is adapted to be used as a safeguard for preventing these tanks or vats or the like from being flooded or overfilled. Assuming that a tank or vat is connected by a pipe-line with the outlet end 12 of the valve structure and the ball 17 is in lifted position, the water circulates through this valve as previously described and enters the tank. As the tank is filled, the column of water rises in the pipeline until this pipe-line is filled. Additional flow of water fills the chamber 14 of the housing 13 and through the back pressure the water column exerts upon the water in the housing this water will pass through the openings 29 in the delivery pipe 21 and will then flow through this pipe 21 and elbow 30 into the reservoir lever 31 and fill the latter. The latter normally, when the valve is open, is in the position shown in broken lines in Figure 2, but upon being filled begins to be weighted and rotates about its axis to a lowered position and rests supported on the pin 36 when filled. Rotation of this reservoir lever turns the free end of the arm 26 downwardly and as this arm is connected to the rod 18, which in turn has the ball 17 secured thereto, lowers this ball until the latter firmly rests on its seat 16, thus closing the supply of fluid passing through the valve. It will be seen that with this invention that the valve is completely automatic, depending upon the back pressure in the pipeline connected to the outlet of the valve to operate the valve by closing the same when the tank is filled and thereby eliminates attendance usually required for boilers, tanks or under similar circumstances. As the tank or vat or other contain releases some of its fluid, part of the fluid in the reservoir handle flows out of the same into the chamber 14 of the valve and when this portion of fluid has left the reservoir handle the coiled spring 34 is capable of counterbalancing the partly weighted reservoir handle and then lifts the latter to the raised position shown in broken lines in Fig. 2, thus raising said lever to an inclined position so that the remainder of the water leaves the lever through the pipeline 21 and this movement again opens the valve, lifting the ball 17 from its seat.

It is to be noted that certain changes in form and construction may be made without departing from the spirit and scope of the invention.

I claim:

1. A valve comprising a conduit, a housing integral with said conduit and communicating therewith, a ball normally seating on one end of said conduit when said valve is closed, and fluid operated means for lowering said ball from the raised position comprising a rod secured to said ball for lifting the latter, an arm rotatable in said housing having its free end connected to said rod, and fluid operated means rotatable in said housing for turning said arm from the upper to the lower position.

2. A valve comprising a conduit, a housing integral with said conduit and communicating therewith, a ball normally seating on one end of said conduit when said valve is closed, and fluid operated means for lowering said ball from the raised position comprising a rod secured to said ball for lifting the latter, an arm rotatable in said housing having its free end connected to said rod, and fluid operated means rotatable in said housing for turning said arm from the upper to the lower position, a delivery pipe rotatable in said housing having said arm attached thereto, said pipe having openings therein within said housing, and means connected to said pipe exterior of said housing being weighted, and lowered by a back pressure of fluid passing into said delivery pipe for lowering said arm to said ball on said conduit.

3. A valve comprising a conduit, a housing integral with said conduit and communicating therewith, a ball normally seating on one end of said conduit when said valve is closed, and fluid operated means for lowering said ball from the raised position comprising a rod secured to said ball for lifting the latter, an arm rotatable in said housing having its free end connected to said rod, and fluid operated means rotatable in said housing for turning said arm from the upper to the lower position, a delivery pipe rotatable in said housing having said arm attached thereto, said pipe having openings therein said delivery pipe projecting out of one side of said housing, a hollow reservoir lever connected to said pipe exterior of said housing, the back pressure of fluid being adapted to circulate into said pipe through said openings and thence into the reservoir to rotatably lower the latter to close said valve, and a coiled spring connected to said reservoir lever for counterbalancing the weight of the latter when said lever is partly filled with fluid.

In testimony whereof I affix my signature.

FRIEDRICH BENSKE.